United States Patent [19]

Ota

[11] Patent Number: 4,692,377
[45] Date of Patent: Sep. 8, 1987

[54] MAGNETIC RECORDING MEDIUM AND PROCESS FOR PRODUCING THE SAME

[75] Inventor: Hiroshi Ota, Komoro, Japan
[73] Assignee: TDK Corporation, Tokyo, Japan
[21] Appl. No.: 878,447
[22] Filed: Jun. 25, 1986
[30] Foreign Application Priority Data Jul. 1, 1985 [JP] Japan ................................. 60-142604

[51] Int. Cl.$^4$ .......................... G11B 5/70; G11B 5/716
[52] U.S. Cl. .................................. 428/323; 427/128; 428/694; 428/900
[58] Field of Search ...................... 428/323, 694, 900; 427/128

[56] References Cited

U.S. PATENT DOCUMENTS 4,528,240  7/1985  Miyoshi et al. .................... 428/694
4,529,661  7/1985  Ninomiya et al. .................. 428/694
4,567,083  1/1986  Arioka et al. ...................... 428/694

Primary Examiner—Paul J. Thibodeau
Attorney, Agent, or Firm—Seidel, Gonda, Goldhammer & Abbott

[57] ABSTRACT

A magnetic recording medium of superior properties is obtained by using a ferromagnetic powder selected from classified powders which satisfy the multiple regression formula:

Y-S/N = −0.0006×Em+0.5707×(Lm/Wm)−0.0005×(Lm-SD)+4.6424 and Y-S/N being more than 2 and the standard deviation of the formula being 2.0 or less, where Y-S/N, Lm, Em, Wm and Lm-SD are as defined in the specification.

2 Claims, 8 Drawing Figures

MAGNETIC RECORDING MEDIUM AND PROCESS FOR PRODUCING THE SAME

BACKGROUND OF THE INVENTION

1. (Technical field)

The present invention relates to a magnetic recording medium and a process for producing the same.

2. (Prior art)

Heretofore, magnetic recording media such as magnetic tapes and the like have been produced by mixing and dispersing ferromagnetic powders such as acicular or other particulate magnetic iron oxides with additives such as a dispersing agent, a lubricant, an wear-resistant abrasive and the like, a resinous binder and a solvent in a ball mill, applying the resulting mixture on a support such as polyester film, drying and slitting it into a tape.

Recently, with the increased demand to high density magnetic recording media, efforts have been directed to the improvement in the S/N ratio as well as in the dispersibility of ferromagnetic powder and other additives. However, all of them failed to provide a magnetic recording medium having satisfactory properties. Particularly, it is known in the art that in order to improve the S/N ratio it is required to use fine particle magnetic powder. However, it is not easy to produce a fine particle magnetic powder having superior properties.

The inventor has made an extensive study on acicular magnetic powders having various average particle sizes and found that the shapes of magnetic particles have deviation due to the difficulties in precise control of the manufacturing process, which leads to a poor dispersion of the powder in a resinous binder, resulting in an insufficient increase of the S/N ratio.

OBJECT OF THE INVENTION

Accordingly, a primery object of the present invention is to provide a magnetic recording medium having a high S/N ratio which is adapted to be applied to the high density recording.

Another object of the invention is to provide a process for producing a magnetic powder having superior properties, especially S/N ratio, which is adapted to be applied to the high density magnetic recording.

SUMMARY OF THE INVENTION

The objects of the invention are achieved by the magnetic recording medium according to the invention. Stating briefly, a starting ferromagnetic powder is classified using a classifier to separate a powder fraction which satisfies the following multiple regression formula:

$$Y\text{-}S/N = 0.0006 \times Em + 0.5707 \times (Lm/Wm) - 0.0005 \times (Lm-SD) + 4.6424$$

and Y-S/N>2
where the standard deviation of Y-S/N is 2.0 or less.

The powder fraction is then dispersed in a high molecule binder and the mixture is contend as a magnetic recording layer on the surface of a support.

DETAILED EXPLANATION OF THE INVENTION

It has been conventionally believed that the S/N is determined by the number of magnetic particles per unit volume or, stated otherwise, the S/N is improved by a factor of 2 when the number of the particles is doubled. However, the inventor has found that the multiple regression formulas can be satisfied when one uses the following explanation variables rather than the number of particles.

According to the invention it is found that a magnetic powder which satisfies the above multiple regression formulas provides a magnetic recording medium of a high S/N ratio.

According to the invention, it has been determined that the important explanation variables are the average maximum longitudinal length Lm(A) of discrete magnetic particles, the standard deviation Lm-SD of Lm, the average maximum transverse width Wm(A), and the average peripheral length Em (A) and, by using a magnetic powder falling in the range defined by the formula:

$$Y\text{-}S/N = (-0.0006 \times Em + 0.5707 \times (Lm/Wm) - 0.0005 \times (Lm-SD) + 4.6424) > 2$$

and the standard deviation of 2.0 or less, a desired S/N can be attained.

The classification of magnetic powders was effected in obtaining the magnetic powders in the Examples by pulverizing starting powders with Pulverizer AP-1, type SH (a tradename of a fine crusher sold by Hosokawa Micron K. K.) into primary particles, which were then classified by using Super Separator MSS-1, type H (a tradename of a classifier sold by Hosokawa Micron K. K.). The carrier was the air.

In place of the above-mentioned fine crusher, other crusher or grinder such as Micronjet (a tradename of a fine crusher sold by Hosokawa Micron K. K.) or Super-Sonic Jet Mill PJM-200SC (a tradename of a crusher sold by Nippon Pneumatic Kogyo K. K.) may be used and as the classifier Dispersion Separator Ds-2 (a tradename sold by Nippon Pneumatic Kogyo K. K.) may be used.

Figure 1:
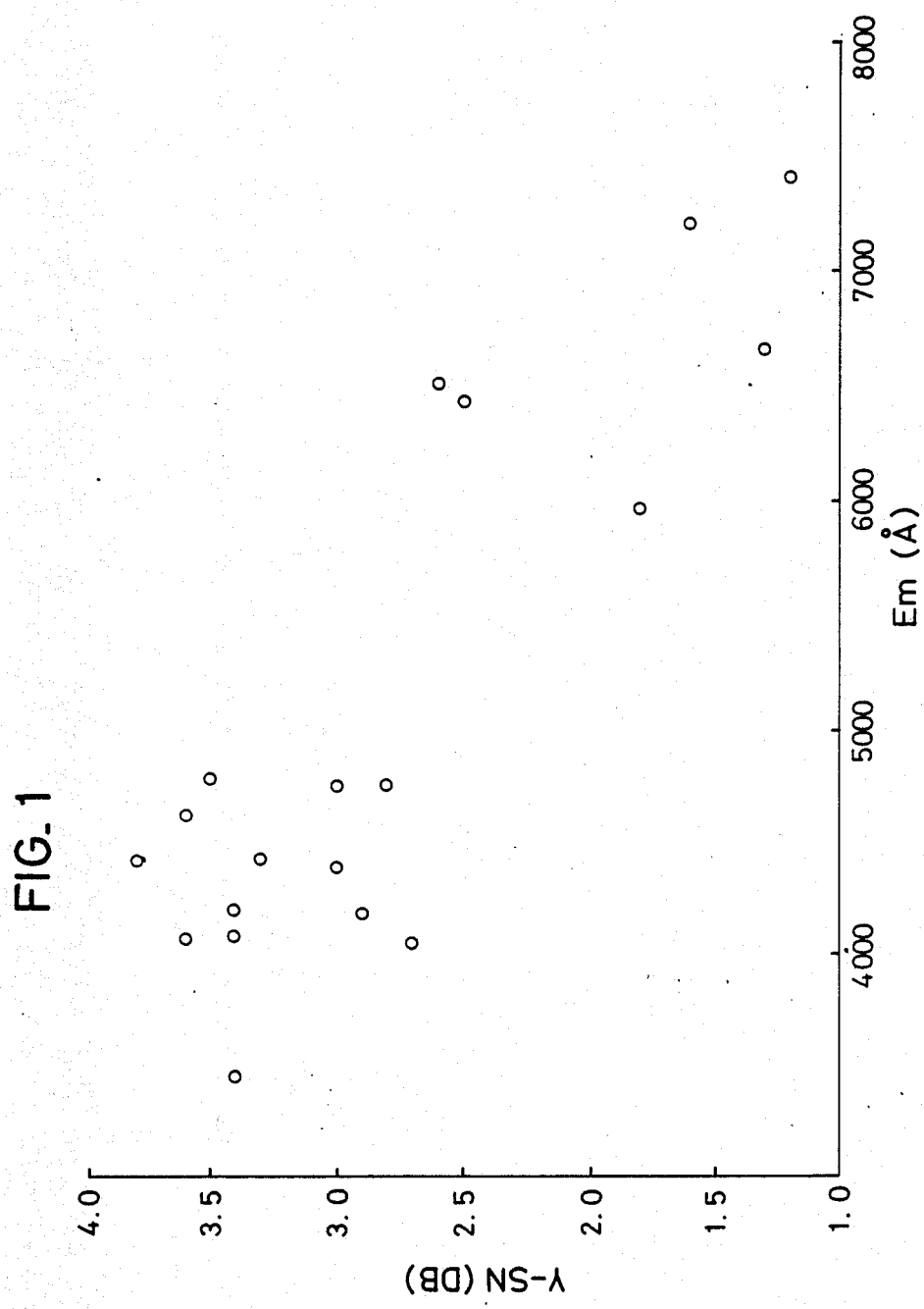
FIG. 1 shows a relationship between the average peripheral length of magnetic particles and the output.
Figure 2:
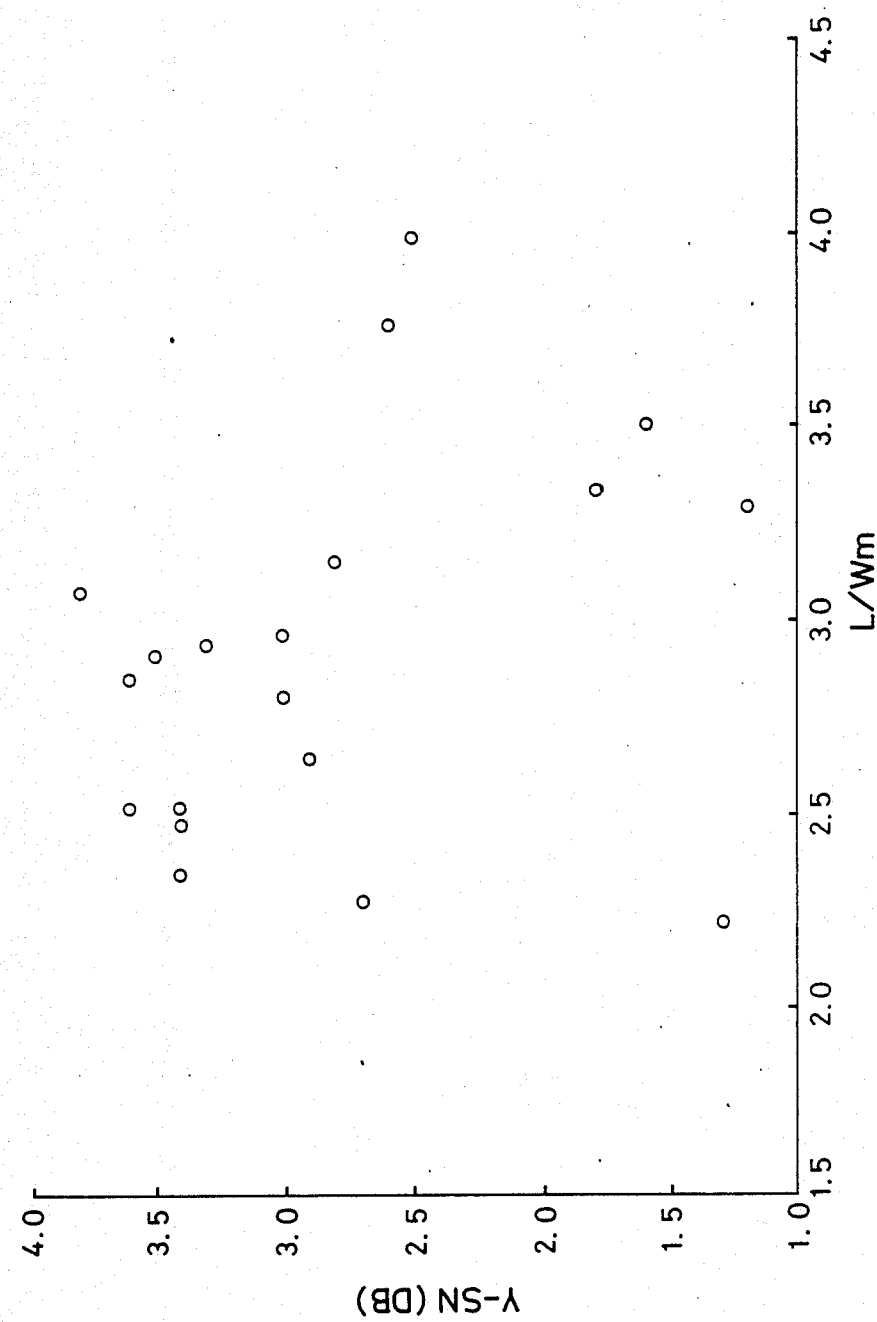
FIG. 2 shows a relationship between the ratio of average maximum longitudinal length to average maximum transverse width and the output.
Figure 3:
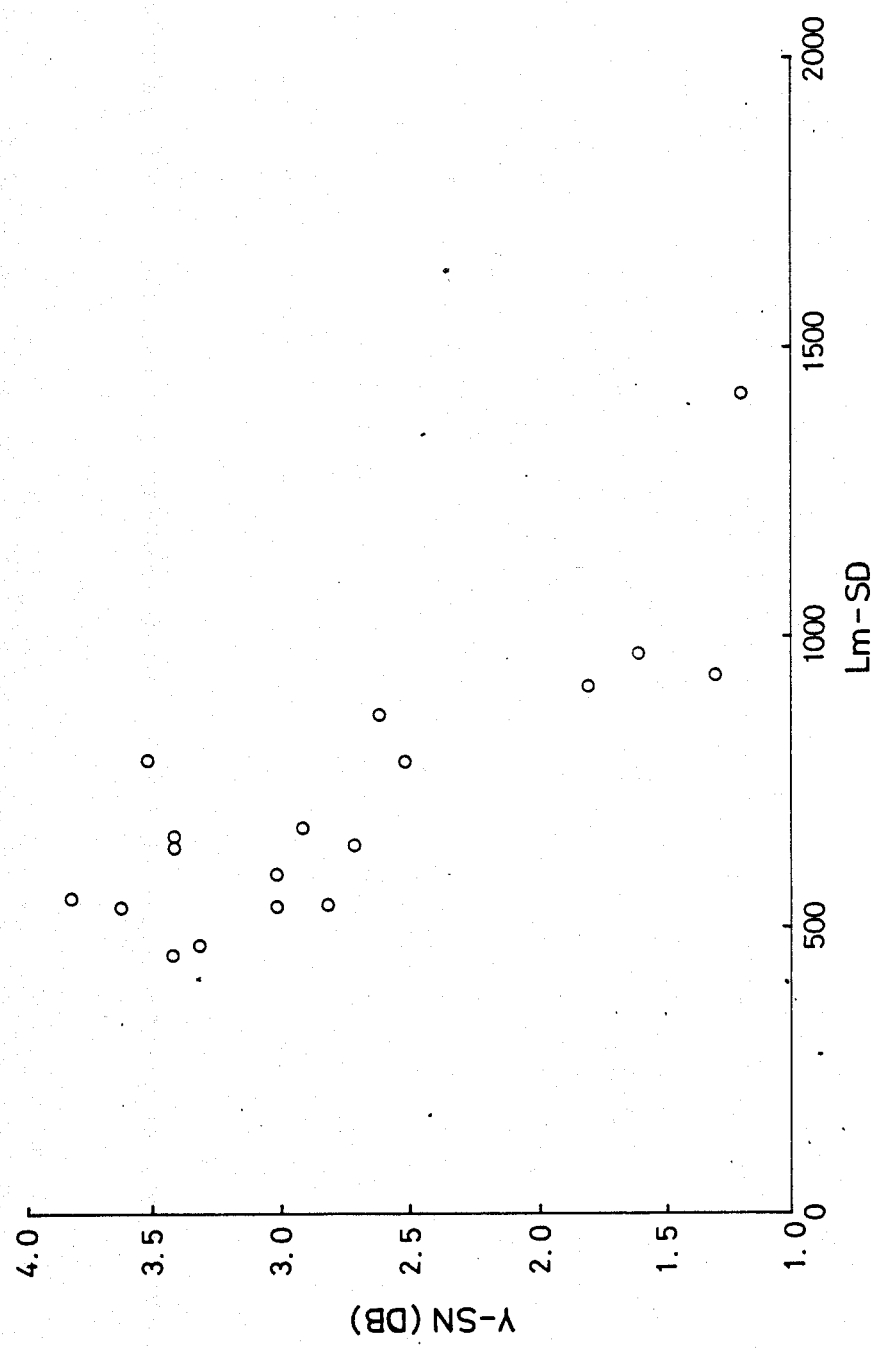
FIG. 3 shows a relationship between the standard deviation of the average maximum longitudinal length and the output.
Figure 4:
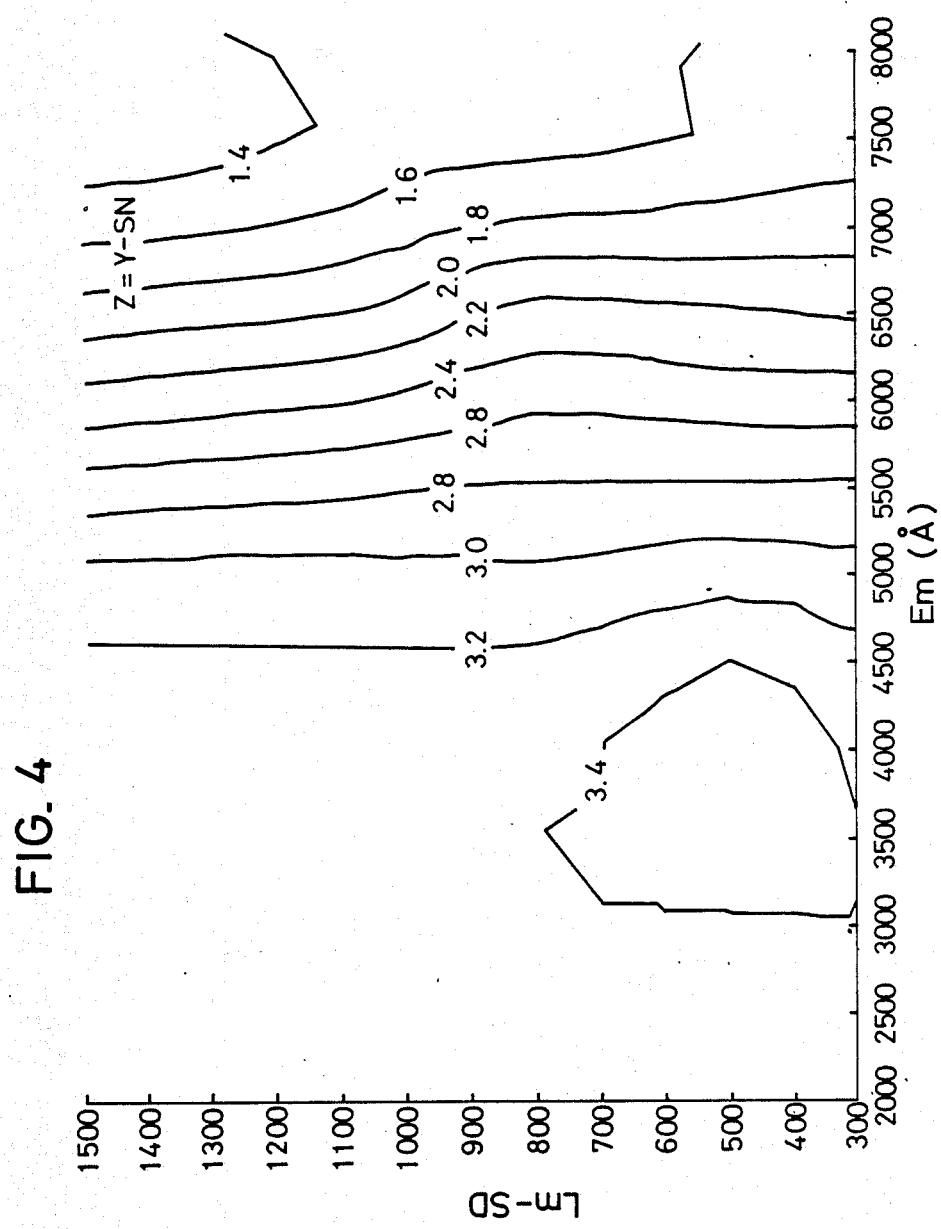
FIG. 4 shows a relationship between the average maximum peripheral length and standard deviation of the average maximum longitudinal length.
Figure 5:
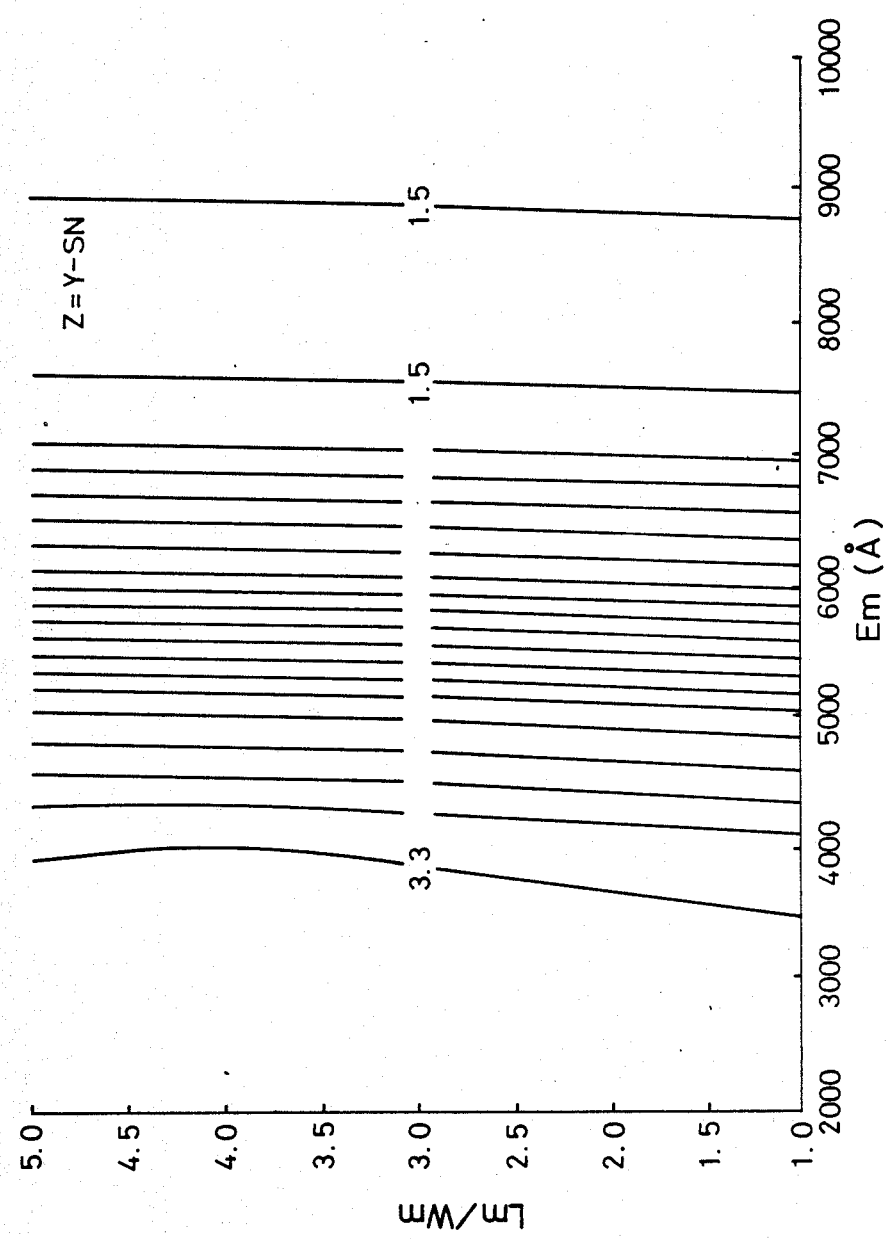
FIG. 5 shows a relationship between the average maximum peripheral length and the ratio of the average maximum longitudinal length to the average maximum transverse width.
Figure 6:
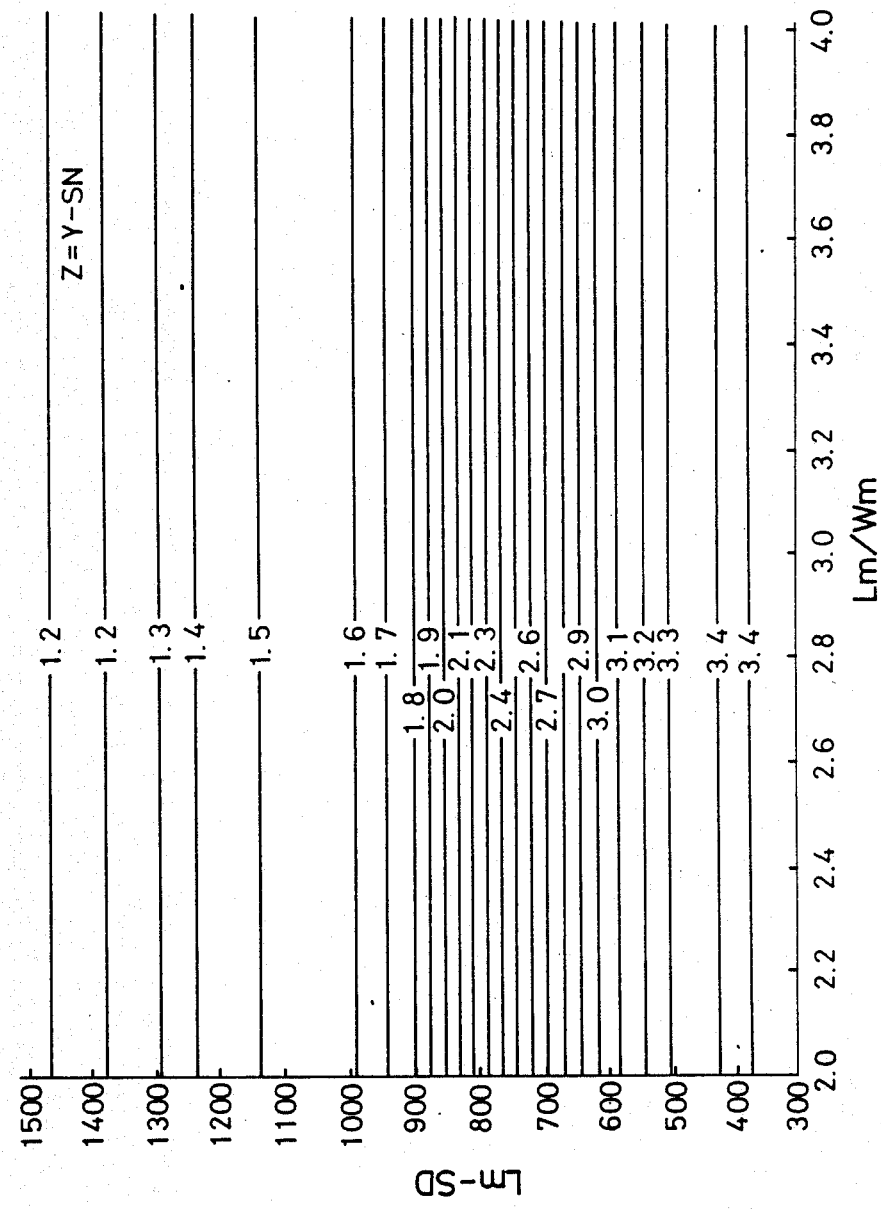
FIG. 6 shows a relationship between the ratio of average maximum longitudinal length to the average maximum transverse width ratio and the standard deviation of the maximum longitudinal length.
Figure 7:
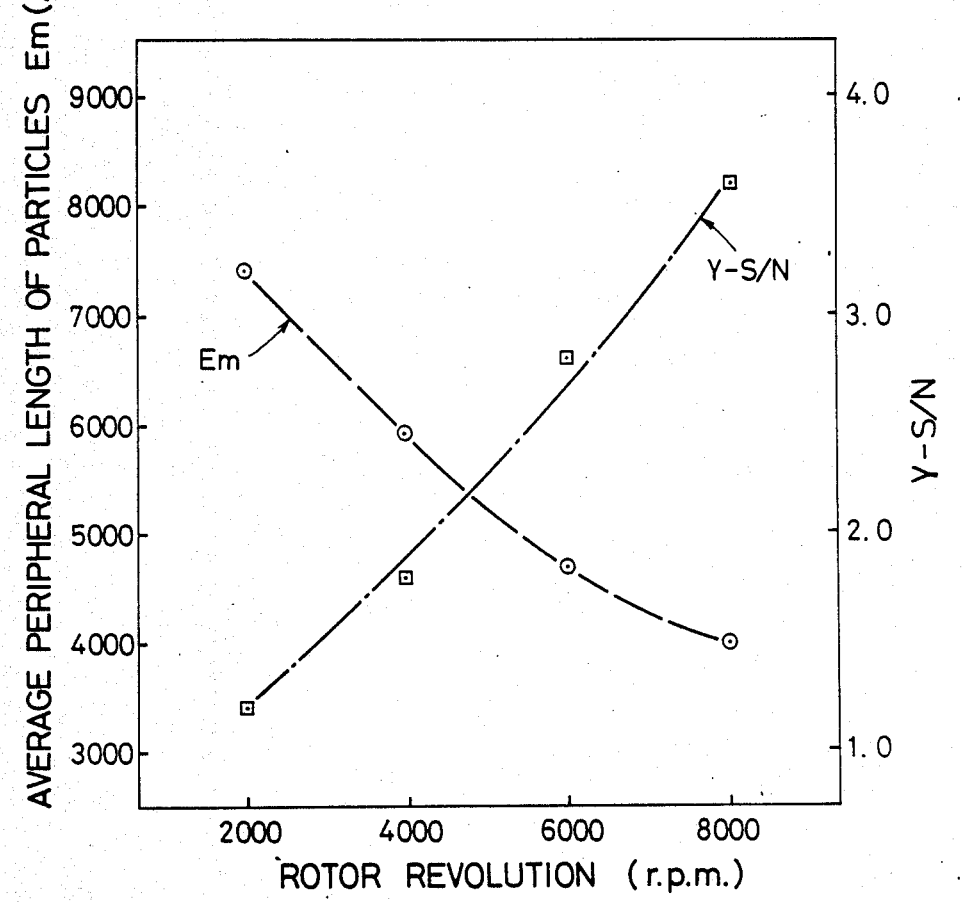
FIG. 7 shows a relationship between the rotor speed and the average peripheral length of finer portion of particles and Y-S/N of tapes prepared therefrom.

More specific method of obtaining a powder fraction separated by the classification will be described in reference to FIGS. 7 and 8. The classifier used was Super Separator MSS-1. FIG. 7 shows a relation between the average peripheral length Em of discrete particles on the finer side and Y-S/N of magnetic recording tapes using the classified powder (Y-axis) and the rotor revolution per minute (X-axis). This result indicates that the greater the rpm of the rotor the smaller is the value Em and the greater is Y-S/N. Accordingly, the value Em can be controlled by adjusting the rpm of the rotor of the classifier. Also, this figure shows that Y-S/N depends on the value Em.

Figure 8:
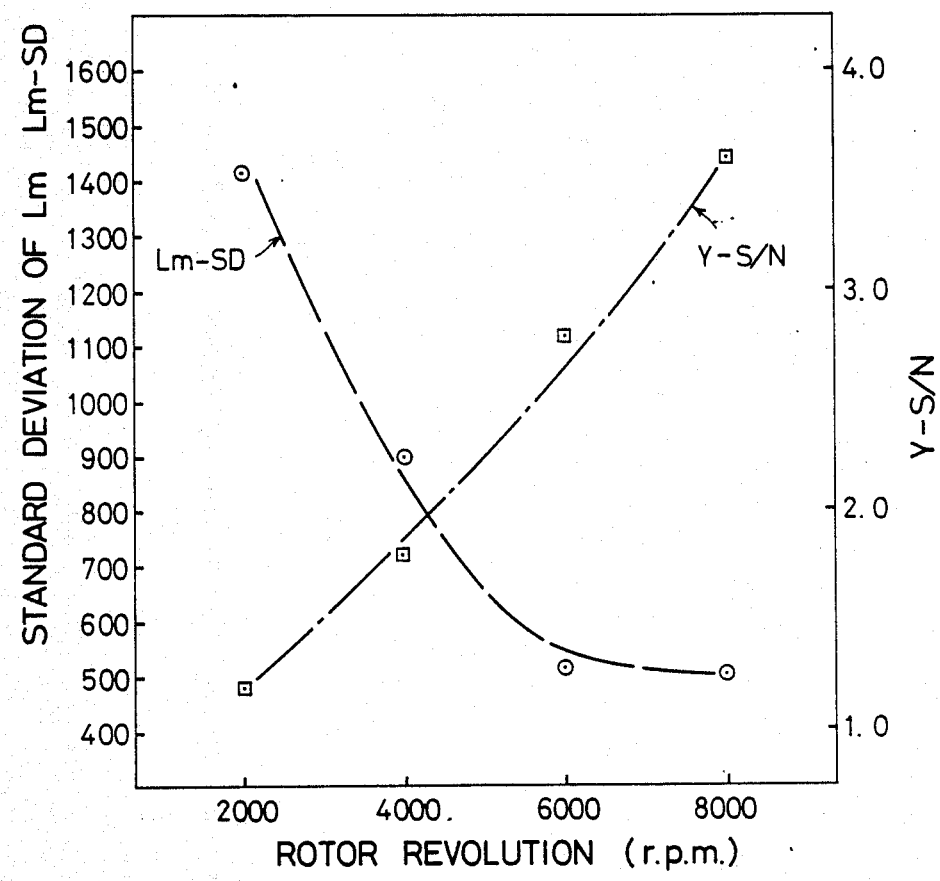
FIG. 8 shows a relationship between the rotor speed and the standard deviation of the average maximum length and the output of tapes therefrom.

FIG. 8 shows a relationship between the standard deviation Lm-SD and Y-S/N of the classified discrete particle on the finer side (Y-axis) and the rpm of the rotor (X-axis). This result indicates that the greater the rpm of the rotor the smaller is the value Lm-SD and the greater is the value Y-S/N. This indicates also that there are important relations between the three values.

The measurements of the maximum longitudinal length, the maximum transverse width and the peripheral length of discrete particles were carried out by using Image Analayzer Ruzex 500 (a tradename of a measuring instrument sold by Nippon Regulator K. K.). Other means such as Super Image Analyzer Ruzex 5000 (a tradename of a measuring instrument sold by Nippon Regulator K. K.), Image Analyzer IBAS II (a tradename of an instrument manufactured by Karl Zeis) and Omnicon 3000 (a tradename of an instrument manufactured by K. K. Shimazu Seisakujo) may be used. This may also be done by directly measuring them on the microscopic photoprints, SEM or STEM images.

The starting magnetic powder may be selected from acicular $\gamma$-$Fe_2O_3$, acicular $Fe_3O_4$, Co-doped or coated acicular $Fe_3O_4$, Co-doped or coated $\gamma$-$Fe_2O_3$, acicular magnetic alloy powders or the like.

The binder may be selected from any resinous binders available in this field. The following binder formulation was used in the Example.

| Composition A | |
|---|---|
| | Parts by weight |
| Vinylchloride-vinylacetate copolymer | 20 |
| Polyester | 13 |
| Lubricant | 5 |
| Methyl ethyl ketone | 100 |
| Methyl isobutyl ketone | 100 |
| Cyclohexanon | 100 |

EXAMPLE

Composition A and 100 parts by weight of a sample from the classified fine ferromagnetic powders tabulated in Table 1 were thoroughly blended and dispersed to form a magnetic coating composition. 5 parts by weight of a polyfunctional aromatic isocyanate was added to the coating composition and the mixture was coated on a polyester base support having a thickness of about 14 μm in such manner that the dry thickness is about 6 μm. The coated support was calendered, subjected to heat treatment at 60° C. for 48 hours to cure it and thereafter slit into a magnetic tape. The Y-S/N was measured and the result is indicated in Table 1. The relations between Y-S/N and the various parameters of the magnetic powder are plotted in FIGS. 1 through 6. In accordance with the known PSS method (Predicted square sum method) (For example, Chuichi Okuno et al "Zoku Tahenryo Kaisekiho" pp. 17–75 published by Nikkagiren), the data in Table 1 were subjected to multiple regression analysis. The multiple regression formula given hereinbefore was obtained with a contribution of 84%. The second term of this formula proves that the axis ratio is important as having been believed heretofore in this field. However, this formula proves further that if the peripheral length, to which no one have attached importance, is taken up a better function form can be obtained. Moreover, the formula shows that, by reducing the dispersion of the longitudinal length, the output is enhanced. The above formula explains the measured values with a high probability, but in order to improve the Y-S/N by at least 2 dB the multiple degression must be at least 2DB. Further, if one selects a powder having, the standard deviator of the Y-S/N is 2.0 or less, the Y-S/N can be positively enhanced as is clear from the table.

In light of the criteria the samples 1, 2, 4 and 19 are outside the scope of the present invention.

The magnetic powder of the present invention can easily be calculated with respect to Lm, Wm, and Em and can be easily predicted as to the Y-S/N of a tape therefrom by seeing whether the powder satisfies the conditions Y-S/N>2 and a standard deviation of 2.0 or less. Thus, if the aimed value for Y-S/N is set above 2, it is easy and simple to set the conditions for the classification of powders.

Lm: Average maximum longitudinal length of discrete particles (Å)
Wm: Average maxium transverse width of discrete particles (Å)
Em: Average maximum peripheral length of discrete particles (Å)
AE: Average surface area of the discrete particles
K: Em×Em
K/AE: K-AE
Lm/Wm: Lm-Wm
Lm-SD: Standard deviation of Lm
Wm-SD: Standard deviation of Wm
Em-SD: Standard deviation of Em
E2/S: Standard deviation of K/AE
L/WS: Standard deviation of Lm/Wm
Y-S/N: Y-S/N is the signal to noise ratio of the tape for the luminance signal The maximum transverse width is defined as the maximum width of the particle as measured in the direction normal to the maximum longitudinal length. The maximum peripheral length is defined as the length along the periphery including the end points of the maximum longitudinal length.

TABLE 1

| Samples | Lm (Å) | Wm (Å) | Em (Å) | K/AE | Lm/Wm | Lm-SD | Wm-SD | Em-SD | E2/S | L/WS | Y-S/N |
|---|---|---|---|---|---|---|---|---|---|---|---|
| 1 | 3138 | 960 | 7406 | 2.41 | 3.29 | 1415 | 28.4 | 1415 | .743 | 1.14 | 1.2 |
| 2 | 2889 | 826 | 6650 | 1.21 | 2.21 | 929 | 22.1 | 1965 | .394 | .776 | 1.3 |
| 3 | 2812 | 731 | 6384 | 2.50 | 3.96 | 764 | 13.8 | 1639 | .634 | 1.12 | 2.5 |
| 4 | 3139 | 887 | 7192 | 2.30 | 3.49 | 961 | 17.3 | 2078 | .603 | 1.07 | 1.6 |
| 5 | 1867 | 678 | 4352 | 1.89 | 2.89 | 441 | 11.5 | 931 | .644 | 1.44 | 3.3 |
| 6 | 1935 | 717 | 4538 | 1.80 | 2.80 | 505 | 12.7 | 1054 | .342 | .738 | 3.6 |
| 7 | 1871 | 660 | 4319 | 1.86 | 2.92 | 508 | 10.7 | 1037 | .417 | .853 | 3.0 |
| 8 | 2044 | 677 | 4694 | 2.00 | 3.11 | 514 | 12.3 | 1047 | .467 | .836 | 2.8 |

TABLE 1-continued

| Samples | Lm (Å) | Wm (Å) | Em (Å) | K/AE | Lm/Wm | Lm-SD | Wm-SD | Em-SD | E2/S | L/WS | Y-S/N |
|---|---|---|---|---|---|---|---|---|---|---|---|
| 9 | 1410 | 626 | 3382 | 1.62 | 2.30 | 426 | 13.4 | 930 | .313 | .634 | 3.4 |
| 10 | 1686 | 697 | 3988 | 1.68 | 2.47 | 509 | 11.7 | 1099 | .320 | .710 | 3.6 |
| 11 | 2855 | 783 | 6455 | 2.29 | 3.73 | 843 | 15.3 | 1777 | .498 | 1.03 | 2.6 |
| 12 | 2015 | 739 | 4693 | 1.78 | 2.76 | 567 | 12.6 | 1183 | .359 | .763 | 3.0 |
| 13 | 1665 | 720 | 3994 | 1.65 | 2.24 | 618 | 15.9 | 1339 | .361 | .677 | 2.7 |
| 14 | 1721 | 704 | 4118 | 1.83 | 2.43 | 609 | 18.2 | 1385 | .467 | .792 | 3.4 |
| 15 | 1768 | 653 | 4118 | 1.95 | 2.61 | 646 | 17.8 | 1371 | .537 | .934 | 2.9 |
| 16 | 1675 | 697 | 4009 | 1.84 | 2.47 | 627 | 18.3 | 1385 | .473 | .853 | 3.4 |
| 17 | 1978 | 738 | 4701 | 2.10 | 2.86 | 756 | 20.5 | 1696 | .681 | 1.08 | 3.5 |
| 18 | 1896 | 632 | 4337 | 2.04 | 3.02 | 519 | 11.0 | 1076 | .510 | .876 | 3.8 |
| 19 | 2607 | 777 | 5938 | 2.12 | 3.32 | 900 | 16.4 | 1913 | .533 | 1.07 | 1.8 |

What I claim is:

1. A magnetic recording medium comprising a non-magnetic support and a magnetic recording layer coated on the support, said recording layer consisting of a ferromagnetic powder dispersed in a binder, characterized in that said ferromagnetic powder is selected from ferromagnetic powders which satisfy the multiple regression formula:

$$Y\text{-}S/N = -0.0006 \times Em + 0.5707 \times (Lm/Wm) - 0.0005 \times (Lm\text{-}SD) + 4.6424$$

and Y-S/N being more than 2 and the standard deviation of the formula being 2.0 or less, where Y-S/N, Lm, Em, Wm and Lm-SD are as defined in the specification.

2. A process for producing the magnetic recording medium as claimed in claim 1, which comprises subjecting a starting ferromagnetic powder to classification treatment, obtaining a powder fraction which satisfies the multiple regression formula:

$$Y\text{-}S/N = -0.0006 \times Em + 0.5707 \times (Lm/Wm) - 0.0005 \times (LM\text{-}SD) + 4.6424$$

and Y-S/N being more than 2 and the standard deviation of the Y-S/N being 2.0 or less, dispersing said powder in a binder; and coating said binder and said powder onto a non-magnetic support.

* * * * *